(12) United States Patent
Boeddeker et al.

(10) Patent No.: US 10,372,445 B2
(45) Date of Patent: Aug. 6, 2019

(54) METHOD FOR PORTING A SINGLE-CORE CONTROL SOFTWARE TO A MULTI-CORE CONTROL DEVICE OR FOR OPTIMIZING A MULTI-CORE CONTROL SOFTWARE

(71) Applicant: DENSO CORPORATION, Kariya, Aichi-pref. (JP)

(72) Inventors: Bert Boeddeker, Eching (DE); Dominik Langen, Eching (DE); Sebastian Kehr, Eching (DE)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/790,320

(22) Filed: Oct. 23, 2017

(65) Prior Publication Data

US 2018/0113706 A1    Apr. 26, 2018

(30) Foreign Application Priority Data

Oct. 24, 2016    (DE) .......................... 10 2016 120 216
Oct. 17, 2017    (DE) .......................... 10 2017 124 105

(51) Int. Cl.
*G06F 8/76*        (2018.01)
*G06F 9/54*        (2006.01)
(Continued)

(52) U.S. Cl.
CPC ............... *G06F 8/76* (2013.01); *G06F 5/06* (2013.01); *G06F 9/38* (2013.01); *G06F 9/5066* (2013.01);
(Continued)

(58) Field of Classification Search
None
See application file for complete search history.

(56) References Cited

U.S. PATENT DOCUMENTS

2009/0112853 A1*    4/2009    Nishizawa ........ G06F 17/30516
2009/0165014 A1*    6/2009    Park ..................... G06F 9/4856
                                                                    718/105
(Continued)

FOREIGN PATENT DOCUMENTS

DE    10 2014 103 139 A1    10/2015
DE    10 2016 107 646.5 A1    10/2017

OTHER PUBLICATIONS

"Porting of Automotive Application on to Embedded Multicore Platform" by Jijinraj, and published in International Journal of Scientific & Engineering Research, vol. 4, Issue 7, Jul. 2013 (Year: 2013).*

*Primary Examiner* — Daxin Wu
(74) *Attorney, Agent, or Firm* — Posz Law Group, PLC

(57) ABSTRACT

A method for porting an existing vehicle control software developed for a single-core control device into a modified multi-core control software or for converting an existing vehicle control software into an optimized multi-core control software is provided. The existing control software comprises numerous repeatedly executable runnables. Information is exchanged between the runnables through writing and reading of communication variables. A modified information exchange via time implicit communication is provided for parallelized runnables in the multi-core control software that is generated by the method. The method includes: analysis of the existing control software regarding a writer-to-reader cardinality of the information exchange with respect to a communication variable; and defining an implementation of the time implicit communication as a function of the determined writer-to-reader cardinality.

16 Claims, 6 Drawing Sheets

(51) Int. Cl.
    *G06F 9/38*       (2018.01)
    *G06F 5/06*       (2006.01)
    *G06F 9/52*       (2006.01)
    *G06F 9/50*       (2006.01)
    *G05B 19/042*         (2006.01)

(52) U.S. Cl.
    CPC ............... *G06F 9/52* (2013.01); *G06F 9/544* (2013.01); *G05B 19/0421* (2013.01); *G06F 2209/5017* (2013.01)

(56) References Cited

U.S. PATENT DOCUMENTS

2012/0120965 A1*   5/2012   Khawer .............. H04L 49/9031
                                                        370/412
2016/0328272 A1*   11/2016  Ahmed ................ G06F 9/4881
2017/0168948 A1*   6/2017   Delgado ............. G06F 12/0864

\* cited by examiner

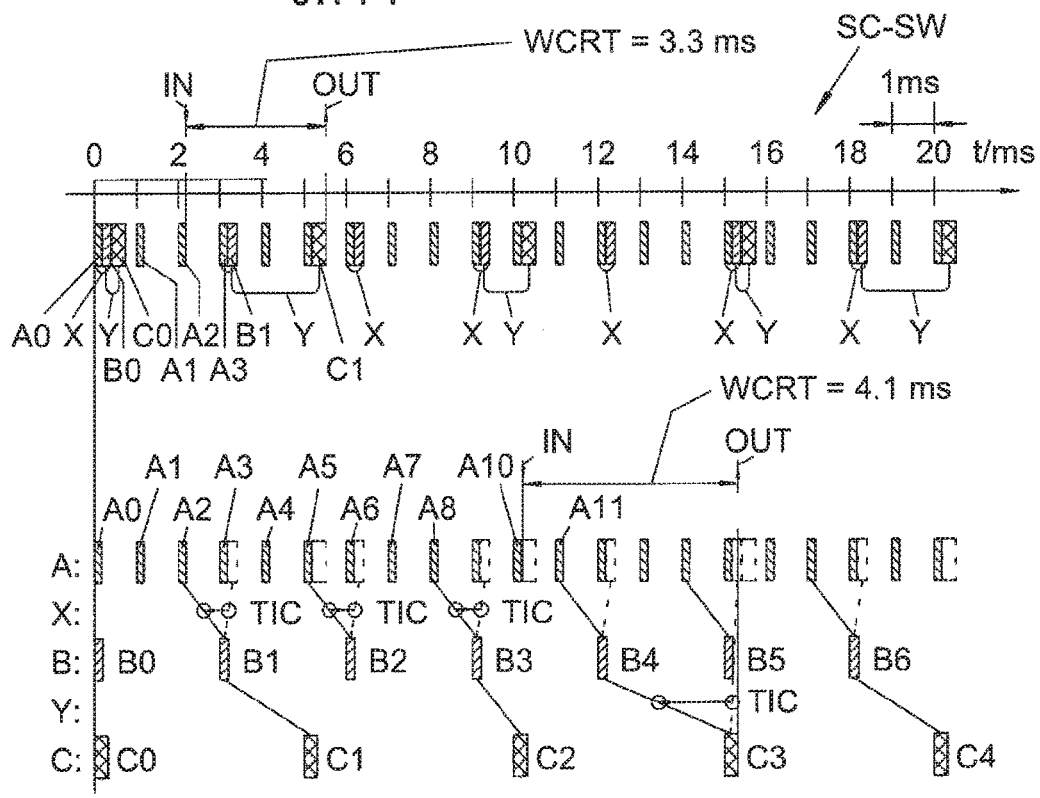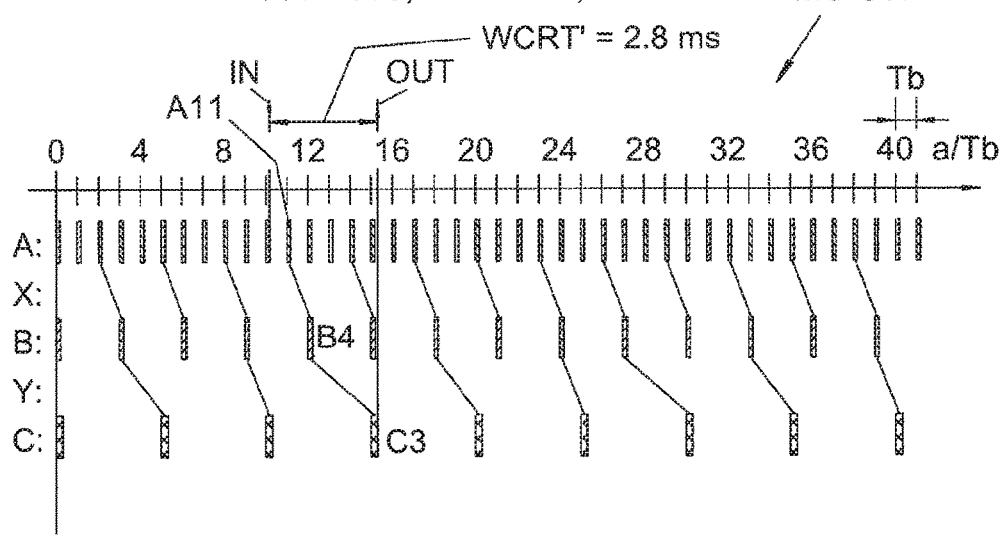

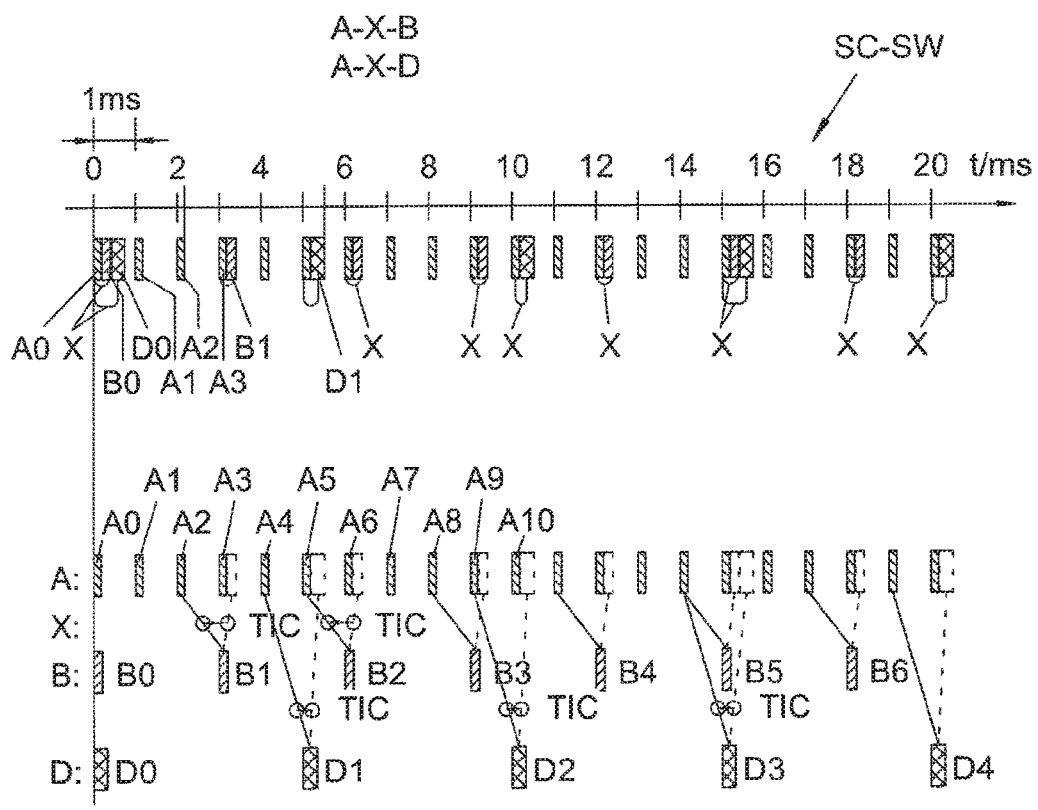
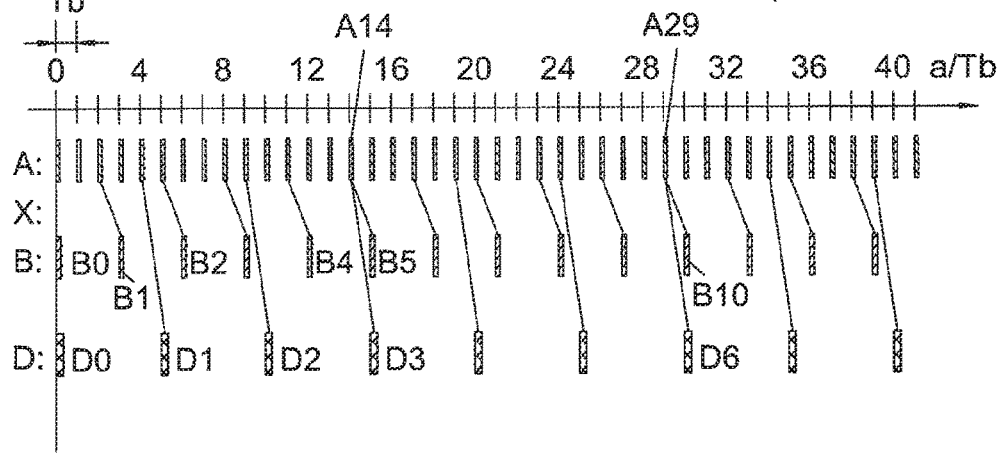

METHOD FOR PORTING A SINGLE-CORE CONTROL SOFTWARE TO A MULTI-CORE CONTROL DEVICE OR FOR OPTIMIZING A MULTI-CORE CONTROL SOFTWARE

CROSS REFERENCE TO RELATED APPLICATION

This application is based on German Patent Application No. 10 2016 120 216.9 filed on Oct. 24, 2016 and German Patent Application No. 10 2017 124 105.1 filed on Oct. 17, 2017, the disclosure of which are incorporated herein by reference.

TECHNICAL FIELD

The present disclosure relates to an SC to MC porting method for control software, i.e. a method for porting an existing vehicle control software developed for a single-core control device (SC software, or SC control software) into a modified control software that can be executed on a multi-core control device (MC software, or MC control software). The present disclosure furthermore relates to a conversion method for creating a modified control software that can be executed on a multi-core control device (optimized MC-Software) from an existing vehicle control-software, which was already designed for a multi-core control device (existing MC-Software).

In the following, the abbreviation "SC" is used to express a reference to a control software or the execution thereof on a single-core control device. In contrast, "MC" refers to a control software or the execution thereof in the initial state or in the ported state on a multi-core control device.

BACKGROUND

It is known from DE 10 2014 103 139 A1 that the porting of control software that has been developed to run on a single-core vehicle control device to a multi-core control device can be executed in an automated process. Furthermore, the use of so-called time implicit communication (TIC) is known from DE 10 2014 103 139 A1. In the following the concepts of parallelization of runnables as well as time implicit communication will be summarized as they contribute to understanding the present disclosure.

An aspect that facilitates the parallelization of runnables and thus porting of SC-software into MC-software is the detection of strong and weak precedence constraints among runnables in the existing control software, which exchange information through persistent memory variables.

In the existing control software runnables may access a persistent memory variable as writers and readers for performing information exchange. These runnables are repeatedly executed (as instances) and perform in each execution substantially the same write- or read-access to the persistent memory variable. Execution of the runnables is executed as a rule at pre-defined periodicities, e.g. every 1, 3, 5 or 10 milliseconds. The periodicities frequently vary for a writer-runnable and a reader-runnable.

In the existing control software it may occur that an instance of a writer-runnable and an instance of a reader-runnable are planned to be executed according to their periodicities simultaneously. In the existing SC-software those runnables must be performed sequentially and precedence-constraints decide on the fact which one of the runnables will be executed before the other. The precedence-constraints can be determined automatically, e.g. based on an execution order or from priorities of tasks or single runnables.

DE 10 2014 103 139 A1 illustrates several rules, according to which a precedence-constraint may be classified as weak or strong. In the porting, weak precedence-constraints can be broken up and replaced by co-ordination of the runnables (setting equal ranks to the runnables) within the MC-software. The co-ordination may lead to time-parallel execution of the instances of the writer-runnable and the reader-runnable. Information exchange among parallelized runnables is then performed through time-implicit communication. For MC-execution, the persistent memory variable is stored in a separately administrated database, which facilitates writing and reading access free of waiting time.

The precedence-constraints in the existing control software ascertain that a write-procedure of a precedent writer-runnable is performed temporally before the read-procedure of a subordinate reader-runnable. This ensures, that for an information transfer among temporally concurring runnables the write-access to the persistent memory variable will be performed temporally separated and prior to a read-access. When those runnables are parallelized, the sequential access to the persistent memory variable cannot be ensured any more. With time implicit communication the temporal relation of access to the persistent memory variable is redesigned. The exchange of current communication data (i.e. in the SC-software write current data first, then read the current data, or respectively first produce then consume current data) is replaced in the MC-execution by usage or a (slightly) older buffered data value for the reader-runnable. A waiting time free access to a separately stored persistent memory variable may be facilitated in that a main memory value and a buffer memory value are set up for each memory variable, wherein the buffer memory value is accessible for reading while a write-access is performed on the main memory value. A reader-runnable, which is executed on a first computational core, may perform a read-access to the latest (older) value in the buffer memory value, while simultaneously a parallelized executed writer-runnable writes a new data value into the main memory value. Thus an instance of the reader-runnable and an instance of the writer-runnable can be fully parallelized and even perform a write-procedure and a read-procedure for the communication variable simultaneously.

SUMMARY

It is an object of the present disclosure to provide an improved porting method or optimization method, with which an MC software can be generated that makes better use of the advantages of the parallelization. The advantages of the generated MC-software may lie in a more efficient use of resources through parallel execution, in efficient use of memory and/or in optimization of the communication performance and/or overall performance.

According to one aspect of the present disclosure, a method for porting an existing vehicle control software developed for a single-core control device into a modified multi-core control software that can be executed on a multi-core control device, or for converting an existing vehicle control software, which is already developed for a multi core control device, into an optimized multi-core control software, wherein the existing control software comprises numerous repeatedly executable runnables, and wherein information is exchanged between the runnables through writing and reading of communication variables, and wherein a modified information exchange via time implicit communication is provided for parallelized runnables in the multi-core control software that is generated by the method is provided. The method includes: analysis of the existing control software regarding a writer-to-reader cardinality of the information exchange with respect to a communication variable; defining an implementation of the time implicit communication as a function of the determined writer-to-reader cardinality, wherein in particular in case of a 1-to-n cardinality a parallelized execution of a writer-runnable and at least one reader-runnable is established in the generated multi-core control software and the related communication variable is stored in a separate ring buffer, which is associated to the writer-runnable.

According to another aspect of the present disclosure, a method for porting an existing vehicle control software developed for a single-core control device into a modified multi-core control software that can be executed on a multi-core control device, or for converting an existing vehicle control software, which is already developed for a multi core control device, into an optimized multi-core control software is provided. The existing control software comprises numerous repeatedly executable runnables. Information is exchanged between the runnables through writing and reading of communication variables. A modified information exchange via time implicit communication is provided for parallelized runnables in the multi-core control software that is generated by the method. Time implicit communication is implemented by storing values of a communication variable are stored together with an associated time rank in a buffer, in particular in a ring buffer.

According to the method, it may be possible that an MC software is generated that makes better use of the advantages of the parallelization. The advantages of the generated MC-software may lie in a more efficient use of resources through parallel execution, in efficient use of memory and/or in optimization of the communication performance and/or overall performance.

BRIEF DESCRIPTION OF THE DRAWINGS

The above and other objects, features and advantages of the present disclosure will become more apparent from the following detailed description made with reference to the accompanying drawings. In the drawings:

FIG. 1A and FIG. 1B are diagrams showing comparison illustrations of an SC control software, a modified structure for the information transfer in a ported MC control software, and an execution plan for the MC control software when a 1-to-1 cardinality is present;

FIG. 3A and FIG. 3B are diagrams showing depictions analogous to FIG. 1A and FIG. 1B for an information exchange in case of a 1-to-n cardinality;

DETAILED DESCRIPTION

The steps to be performed in porting an existing SC control software in to an MC control software, can be applied in the same way in an optimization method that converts an existing MC control software into an optimized MC control software. For the sake of simplified illustration, only the porting method will be explained below by taking reference to the drawings. The described measures can be implemented respectively in the same way in an optimization method according to the present disclosure.

Figure 5A:
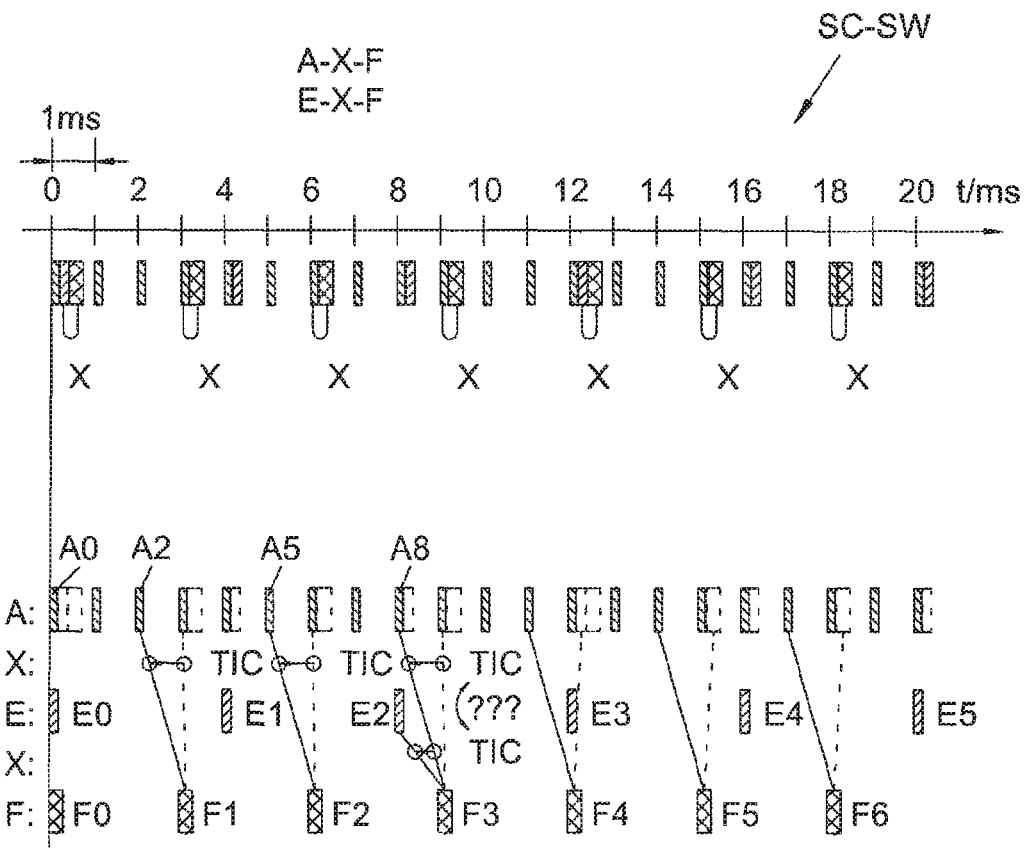
FIG. 5A and FIG. 5B are diagrams showing depictions analogous to FIG. 1A and FIG. 1B for an information exchange in case of an m-to-1 cardinality.
Figure 5B:
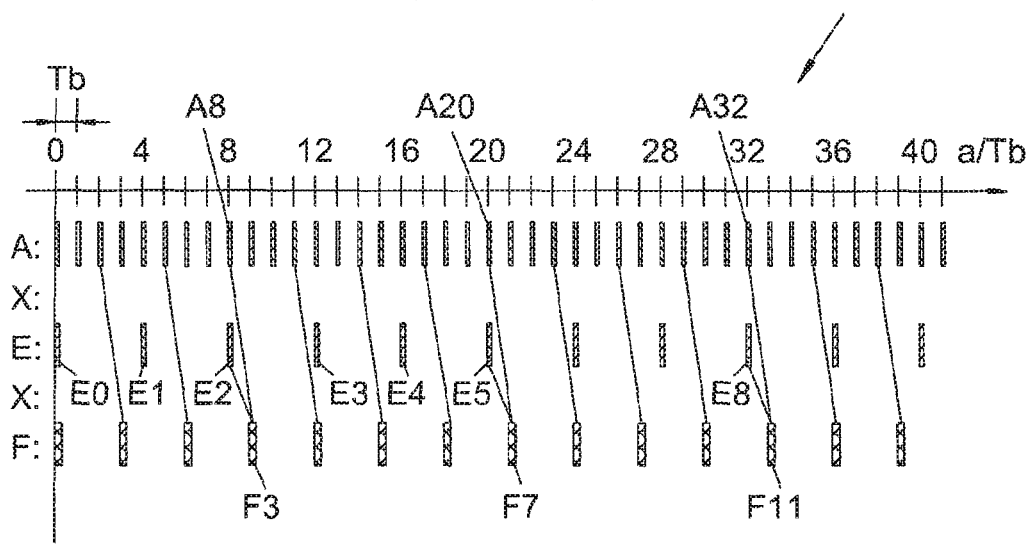

In the upper parts of FIG. 1A, FIG. 3A and FIG. 5A, different examples of an information exchange between runnables (A, B, C/A, B, D/A, E, F) are depicted. First, the different starting conditions in a branched or unbranched information transfer in the SC control software (abbreviated: SC software) shall be explained below. Subsequently, measures for converting the structure of the information transfer for MC execution, as well as concrete MC execution plans, shall be explained.

In the example in FIG. 1A, a first runnable (A) writes a first communication variable (X). A second runnable (B) reads the first communication variable (X). Otherwise, none of the runnables have access to this communication variable (X). Accordingly, there is a 1-to-1 cardinality (cX: 1-1) between the first and the second runnable (A, B). The term "cX" represents cardinality of information exchange for first communication variable.

The second runnable (B) writes a second communication variable (Y), which is read by a third runnable (C). Otherwise, none of the other runnables have access to the second communication variable (Y). Accordingly, there is a 1-to-1 cardinality (cY: 1-1) for the communication variable (Y) for the information transfer. In the example of FIG. 1A, an unbranched information transfer is defined for the communication variables (X, Y). The term "cY" represents cardinality of information exchange for second communication variable.

In the examples of FIG. 3A and FIG. 5A, there are given two possibilities for a branched information transfer, which represent variations on the example of FIG. 1A. The person skilled in the art will recognize that in practice, arbitrary combinations of the forms of the information transfer discussed herein may exist. Thus, the features explained with respect to the three exemplary embodiments of FIG. 1A to FIG. 2, FIG. 3A to FIG. 4 and FIG. 5A to FIG. 6 can be combined in an arbitrary manner.

For purposes of better readability, the reference symbols (X) and (Y) shall be used uniformly for the communication variables in the three exemplary embodiments. The person skilled in the art will recognize that in the exemplary embodiments, these can each be the same communication variables or different communication variables. A total of six runnables (A, B, C, D, E, F) are used to represent the possible forms of the information transfer. Insofar as the reference symbols of these runnables coincide in the exemplary embodiments, these can be the same or different runnables.

In FIG. 3A, a first runnable (A) writes into a first communication variable (X). This communication variable (X) is read by a second runnable (B) and likewise by a fourth runnable (D). With respect to the communication variable (X), there are thus exactly one writer runnable (A) and (at least) two reader runnables (B). Accordingly, a 1-to-n cardinality (cX: 1-n) is determined for the information transfer. Multiple reader runnables (B, D) share information that is made available by just one writer runnable (A).

In the example of FIG. 5A, the reverse case is present. Here, both a first runnable (A) as well as a fifth runnable (E) write into a first communication variable (X), which is only read by a sixth runnable (F). Accordingly, there is an m-to-1 cardinality (cX: m-1) for the information transfer.

It is proposed according to the present disclosure to analyze an existing control software (SC-SW) with regard to the writer-to-reader cardinality (cX, cY) of the information exchange with respect to a communication variable (X, Y). Such an analysis is preferably carried out partially or entirely automatically, e.g. through an evaluation of the source code or an evaluation of the memory accesses by different processes during the execution of the SC software on a single-core control device.

It is furthermore proposed that the parallelization or sequencing of the participating writer runnables (A, B, E) and reader runnables (C, D, F) be established depending on the determined writer-to-reader cardinality (cX, cY).

A modified information exchange via time implicit communication (TIC) is provided in the MC software (MC-SW) for parallelized runnables. The implementation of the time implicit communication can take place in any arbitrary manner. It is particularly preferred (potentially depending on the established cardinality) that a value of a communication variable (X, Y) is stored together with an assigned temporal rank in a ring buffer (MX, MY). The value in the ring buffer (MX, MY) that is to be used for a specific instance (B0, B1, . . . ), (C0, C1, . . . ) of a reader runnable (B, C) is determined on the basis of the temporal rank stored in the ring buffer. In particular, the respective most current temporal rank in the ring buffer (MX, MY) can be determined for each instance of a reader runnable. This shall be explained in detail below with reference to FIG. 1A to FIG. 3B.

The runnables (A, B, C) are executed with different periodicities (PA, PB, PC) in the SC software (SC-SW) according to FIG. 1A. The first runnable (A) has a periodicity (PA) of 1 ms. A first instance (A0) of the first runnable (A) is executed at time (t=0 ms). At the further times (t=1 ms, t=2 ms, t=3 ms, etc.), a further instance (A1, A2, A3, etc.) of the first runnable (A) is executed. Each of these instances (A0, A1, A2, . . . ) writes a current value into the communication variable (X), which can be implemented in the SC execution, e.g. as a single field, or single memory cell.

The second runnable (B) has a periodicity (PB) of 3 ms. Accordingly, the instances (B0, B1, B2. . . . ) are each executed at times (t=0 ms, t=3 ms, t=6 ms, etc.). Each instance (B0, B1, B2) reads the value of the communication variable (X) and writes a value into the communication variable (Y).

The third runnable (C) has a periodicity (PC) of 5 ms. Accordingly, the instances (C0, C1, C2, . . . ) are executed at the times (t=0 ms, t=5 ms, t=10 ms, . . . ). Each instance (C0, C1, C2, . . . ) reads the value of the communication variable (Y).

In the lower part of FIG. 1A, an information transfer structure for the MC software is depicted, having the same runnables (A, B, C), using time implicit communication. The three runnables (A, B, C) are parallelized here, i.e. executed in a temporally overlapping, or fully simultaneous manner.

As a result of the parallelization, the instances (B1, B2, B3, . . . ), (C1, C2, C3, . . . ) of the second and third runnables (B, C) are executed at a relatively earlier point in time with respect to the SC execution. The boxes formed by a broken line in the lower part of FIG. 1A indicate, for comparison purposes, the executing times of the instances of the runnables (B, C) in the SC execution, while the boxes illustrated with solid lines depict the execution times in the MC execution.

Due to the parallelization, it cannot be ensured that a writing the communication variable (X, Y) by a writer runnable (A, B) is completed before a reader runnable (B, C) assigned thereto accesses the same information (broken line connecting A instance to B instance, or B instance to C instance). In order to nevertheless ensure that a correct execution of the control software is (always) maintained, time implicit communication (TIC) is used. The time reference of an information to be used by the reader runnable (B, C) is redirected to a value of the respective communication variables (X, Y), which has already been written at an earlier point in time (solid line from A instance to B instance, or from B instance to C instance).

In the following, possible effects of time implicit communication shall be explained.

It is provided, for example, in the SC execution according to FIG. 1A, that a runnable (A3) writes a value of the communication variable (X) at the time t=3 ms, which is read in directly thereafter by an instance (B1) of the second runnable (B). The information transfer thus follows the path A3-X-B1.

In the MC execution, the instance (B1) of the second runnable (B) is executed in parallel to the instance (A3) of the first runnable (A). Accordingly, the value of the communication variable (X) written by the instance (A3) is not yet (surely) available, when the instance (B1) of the runnable (B) needs this value. For this reason, a value of the communication variable (X) is made available to the instance (B1), which was written by the preceding instance (A2) of the first runnable (A). The information transfer thus follows the redirected path A2-X-B1. There is therefore a structural change or extension of the information transfer. The same applies for the instances (B2 to B6 and C3) of the reader runnables (B, C).

The implementation of the time implicit communication (TIC) can thus result in a structural extension of the information transfer in a chain of effects through the control software. However, not every extension is problematic for the correct execution of the control software.

Furthermore, a structural extension of the information transfer can be counteracted by adjusting the timing in the execution of the MC control software. This shall be explained below.

In the example from FIG. 1B, the same structure is used for the information transfer that was used in the lower part of FIG. 1A. However, the temporal execution of the MC control software (MC-CS) is scaled, such that a worst case reaction time (WCRT') with the MC software is shorter than or s equal to the worst case reaction time (WCRT) in the SC execution.

In the example of FIG. 1A, the worst case reaction time (WCRT) that can result in the structurally longest chain of effects is indicated in the upper diagram. It is assumed that a physical change (IN), to which the control software should react, takes place directly after the execution of the instance (A2) of the first runnable (A). This physical change cannot be detected earlier than by the instance (A3) of the first runnable (A), and converted to a corresponding value of the communication variable (X). The instance (B1) reads and processes the modified value of the communication variable (X) and then writes a modified value of the second communication variable (Y). The instance (C1) of the third runnable (C) reads in the modified value of the second communication variable (Y) and generates a control command (OUT) as a function thereof, which embodies the reaction of the control software to the physical change, i.e. it creates the control result thereof. The longest possible processing path therefore follows the chain of effects: IN-A2-X-B1-Y-C1-OUT. The worst case reaction time WCRT is 3.3 ms in this example.

In the MC execution, according to FIG. 1B (without adjusting the execution dynamics), the worst case reaction time (WCRT) resulting from the time implicit communication in another chain of effects by the instances, is specifically: IN-A11-X-B4-Y-C3. The worst case reaction time WCRT is 4.1 ms here.

In a manner analogous to the above explanations, a physical change (IN) takes place in the worst case directly after the end of the instance (A10) of the first runnable (A). This is detected by the following instance (A11), and transformed to a value of the first communication variable (X), which is processed by the following instance (B4) of the second runnable (B). This instance (B4) writes an updated value into the communication variable (Y), which is processed by the instance (C3) of the third runnable (C), and converted to a control command (OUT).

In reference to FIG. 1B, it shall now be explained, merely by way of example, how the structural extension of the worst case reaction time can be compensated for through a change in the execution dynamics of the MC software.

to The relationship of the periodicities (PA, PB, PC) is adopted in the MC execution according to FIG. 1B. Here, however, the periodicities are accelerated and set to a base interval (Tb). Accordingly, the MC software is executed with a modified execution time (a), which deviates from the real time (t). This execution time (a) is particularly preferably a cyclical execution is time. A base interval (Tb) having a specific duration is established and each execution cycle lasts as long as this base interval (Tb). When the base interval (Tb) is selected such that it is shorter than the shortest periodicity provided for the SC software, the MC software is executed at an accelerated rate.

By comparing the lower parts of FIG. 1A and FIG. 1B, it is evident that the cycle scale (a) is compressed in comparison to the real time scale (t).

The structural extension of the information transfer can be compensated for by accelerated execution. In the example of FIG. 1B, a worst case reaction time (WCRT) of 2.8 ms is obtained in the MC execution, for example, which is actually shorter than the worst case reaction time of 3.3 ms in SC execution.

In the example of FIG. 1B, no concrete implementation is provided between the runnables (A-B, B-C) for the information transfer. The writing and reading accesses can take place in principle at arbitrary times. Accordingly, it is not ensured that all of the writing and reading accesses to the communication variables (X, Y) take place in an efficient manner and without conflicts among each other.

Figure 2:
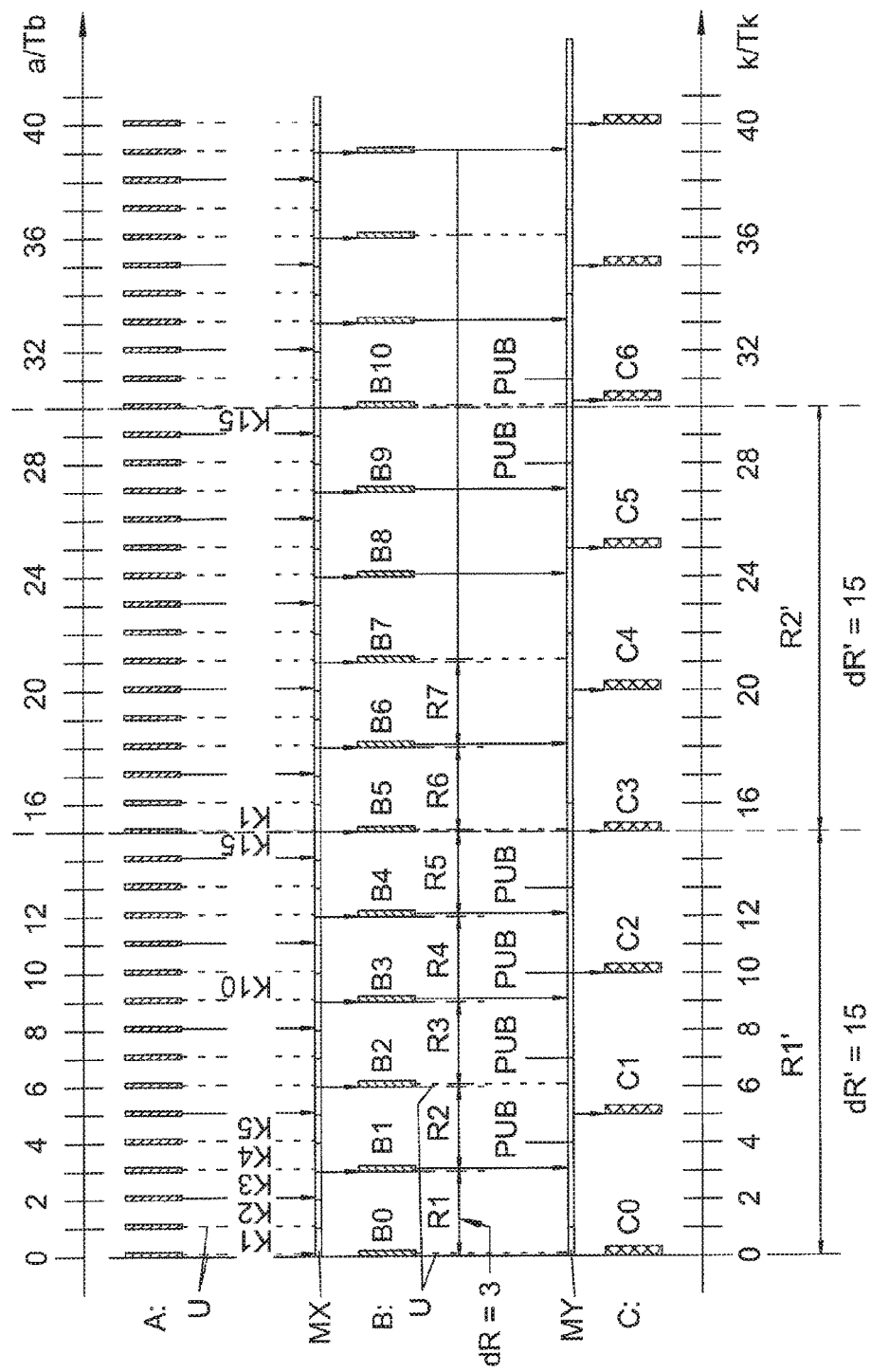
FIG. 2 is a diagram showing an enlarged illustrations of the MC control software according to FIG. 1B, wherein values of the communication variables are stored in ring buffers, and read out in a cyclical communication scheme.

FIG. 2 shows the MC software (MC-SW) from FIG. 1B in an enlarged depiction, and illustrates a particularly beneficial implementation of the information transfer with ring buffers (MX, MY) and writing accesses in a cyclical communication scheme for a 1-to-1 cardinality.

A first ring buffer (MX) and a second ring buffer (MY) are provided in each case for storing the values of the respective communication variables (X, Y). Each instance of a writer runnable (A, B) stores a current value of the respective communication variable (X, Y), together with an associated temporal rank, in the ring buffer (MX, MY) provided for this communication variable (X, Y). Thus, numerous values of the communication variables (X, Y) are stored in each of the ring buffers. Each instance of a reader runnable (B, C) obtains access to that value in the ring buffer (MX, MY) that is the correct one at the point in time that the reader runnable (B, C) is executed. This can be that stored value in particular that has the most current temporal rank.

Particularly preferably, a search algorithm can be executed on the ring buffer, in order to determine the correct, or most current, temporal rank, and to read out the assigned value. Alternatively, another search or identification strategy can be deposed for finding the "correct value." Alternative strategies shall be explained below.

The writings and readings applied to the communication variables (X, Y) or the ring buffer (MX, MY) can fundamentally take place in an arbitrary time scheme. It is advantageous, however, to use a communication scheme that is based on uniform communication cycles (K1, K2, ...) at least for the reading of communication variables (X, Y). In this communication scheme, a base interval (Tk) having a specific duration is established, and each communication cycle (K1, K2, ...) lasts as long as this base interval (Tk). Writing accesses to the ring buffers (MX, MY) can take place at an arbitrary time, in order to write the current value of a communication variable (X, Y) into a field of the ring buffer (MX, MY). However, a specific future communication cycle (K1, K2, ...) is established for each written value of a communication variable (X, Y) as the publication time (Pub) and temporal rank. The written value is not made available for a reading access before reaching the publication time (Pub). The cyclical communication requiring publication times prevents the occurrence of non-deterministic states. The path (potentially modified with respect to an SC execution) for the information transfer (through instances of the runnables in specific cycle sequences) can be defined in a fixed manner.

Figure 4:
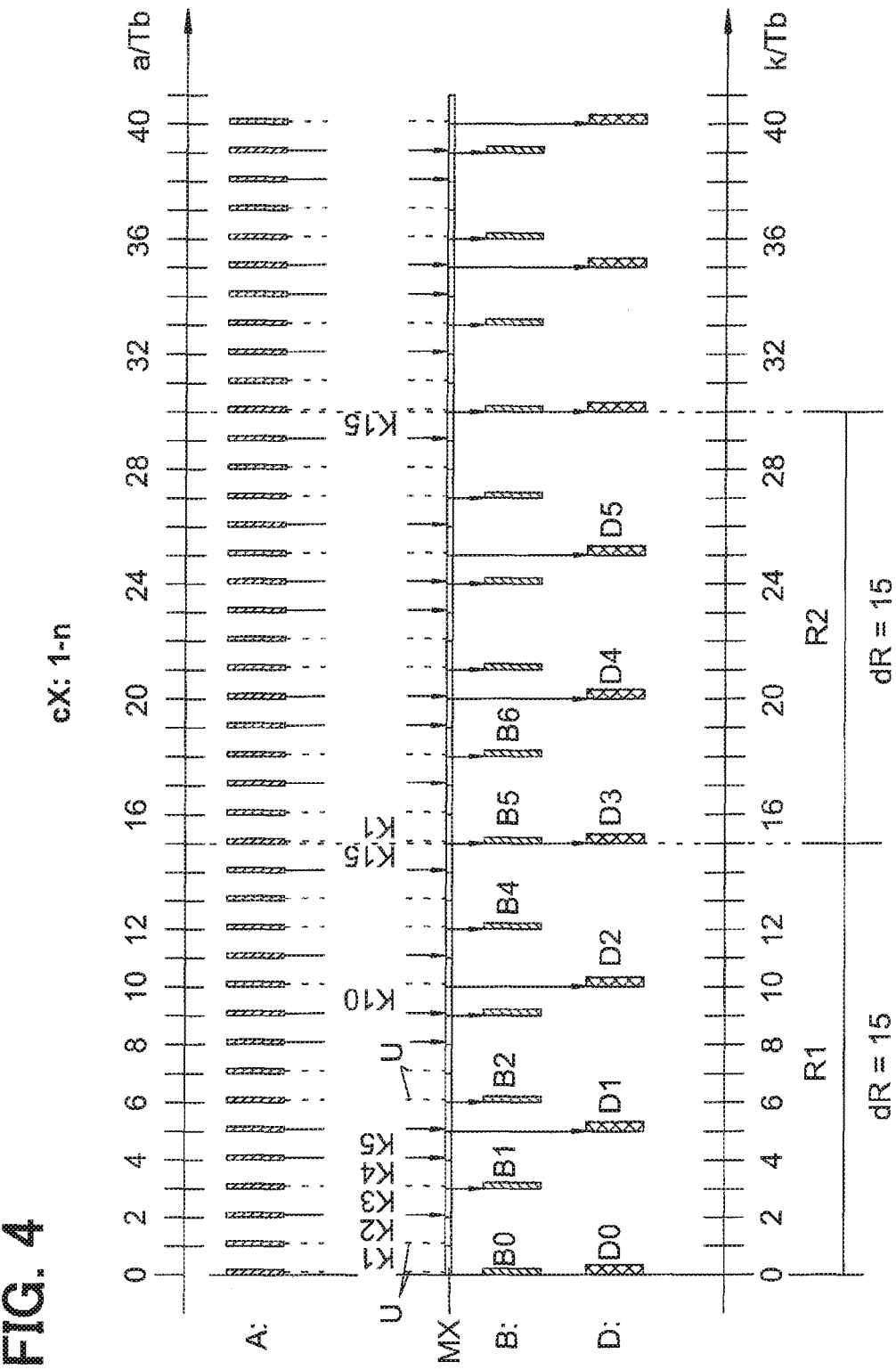
FIG. 4 is a diagram showing depiction analogous to FIG. 2 for an information exchange in case of a 1-to-n cardinality.
Figure 6:
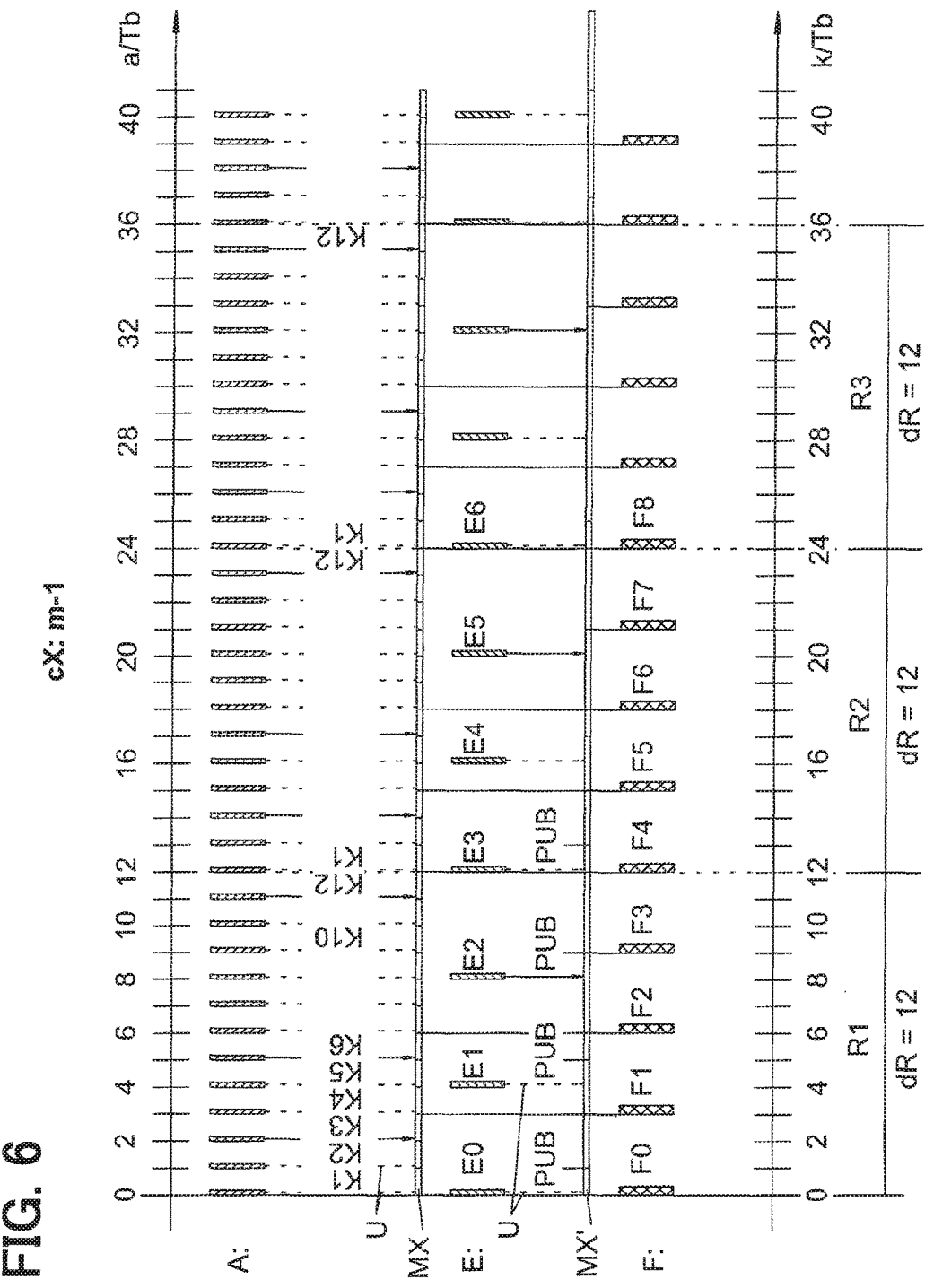
FIG. 6 is a diagram showing depiction analogous to FIG. 1A, FIG. 1B and FIG. 2 for an information exchange in case of an m-to-1 cardinality.

The base interval (Tb, Tk) for the communication scheme (k) and the execution scheme (a) can preferably be identical. Accordingly, the duration of a communication cycle (K1, K2, ...) can be equal to that of an execution cycle. However, if applicable, a fixed time offset may be provided between a communication cycle and an execution cycle (not shown). For purposes of simplification, identical cycle scales (a, k) are presently provided for the execution scheme and the communication scheme. The cycle scale (a) for the execution scheme is depicted in FIG. 2, FIG. 4 and FIG. 6 at the upper edge. The cycle scale (k) for the communication scheme is depicted at the lower edge.

The use of a cyclical communication scheme has the advantage that the input values for a reader runnable are kept constant during its execution, or its execution cycle (=1 or more communication cycles). It is thus not important whether a reading access takes place during the run time of an instance of the reader runnable at the beginning, in the middle, or at the end of an execution cycle or communication cycle. A writing access that takes place too early cannot lead to an unanticipated modification of the information transfer. Errors caused by competing reading and/or writing memory accesses are effectively prevented.

In the example of FIG. 2, the instance (A0) of the first runnable in the execution cycle a=0 writes (at some time) a value of the communication variable (X) into the buffer memory (MX), to which the (next) communication cycle k=1 or k=2, or execution cycle a=1 is assigned as the publication time (not indicated) and temporal rank. The instance (B1) writes (at some time) a value of the communication variable (Y) into the buffer memory (MY) during the execution cycle a=3, to which the (next) communication cycle k=4 or k=5 is assigned as the publication time (PUB) and temporal rank, etc. Writings of a runnable (A, B) in a buffer memory (MX, MY) are depicted as either vertical arrows or as broken lines. The graphic distinction of these writings shall be explained further below.

A situation is shown by way of example for the instance (C6) in FIG. 2, in which the execution is delayed (e.g. due to an interrupt) in the execution cycle a=30, such that the read procedure of instance (C6) to the buffer memory (MY) actually takes place at a later point in time than the writing of the instance (B10) of the second runnable (B) executed in the same execution cycle a=30. Such value in the ring buffer is provided to the instance (C6) that was written by the preceding instance (B9) of the second runnable (B) and that was published for the reading access at the publication time (k=28), although the more current value from the instance (B10) is already available. This is because the publication time k=31 of this new value has not yet occurred. Thus, the determined communication pattern is maintained, despite the unexpected change to the execution.

FIG. 3A shows in the upper region an SC software having a 1-to-n cardinality (cX: 1-n) of the information transfer. The communication variable (X) is only written by the first runnable (A), but it is read in by the second and fourth runnables (B, D).

In the lower region of FIG. 3A, an execution structure with parallelization of the runnables (A, B, D) is shown. As with the above explanations, time implicit communication is also used here. The relationship of the periodicities (PA, PB, PD) of the runnables (A, B, D) corresponds to the example from FIG. 1A. FIG. 3B and FIG. 4 show an MC execution of the ported control software in which the 1-to-n cardinality of the information transfer is likewise adopted. The depictions are executed in a manner analogous to FIG. 1B and FIG. 2 explained above.

It is apparent that the instances (B5) and (D3), as well as (B10) and (D6) of the second and fourth runnables (B, D), access the same value of the communication variable (X) that was written by the instance (A14) or (A29), respectively, of the first runnable.

It has been recognized that in the case of a 1-to-n cardinality a parallelized execution of the writer runnable and the numerous reader runnables is also possible, and that the storage of the communication variable (X) can be provided for in a ring buffer (MX). Furthermore, the use of a cyclical communication scheme (k) is also advantageous with the 1-to-n cardinality. Likewise, the advantage of a ring buffer is particularly effective in case of the 1-to-n cardinality.

Numerous reading accesses can take place simultaneously on a ring buffer, such that two parallelized executed reader runnables (B, D) do not interfere with one another. The implementation of the information transfer according to FIG. 3A with a single ring buffer (MX) for storing the communication variable (X) is shown in FIG. 4. This can be the same ring buffer that was used in the exemplary embodiment from FIG. 2, or it can be another ring buffer.

It is clear that the instance (B5) of the second runnable (B) and the instance (D3) of the fourth runnable (D) read in the same value of the communication variable (X) (at the start of, or any time within, the communication cycle k=15), that was written by the instance (A14) of the first runnable (A). These reading accesses can take place successively, in a temporally overlapping manner, or fully in parallel, without interfering among each other. Thus, it is not necessary to buffer the values of the communication variable (X) twice, such that an unnecessary overhead for the management of the time implicit communication is avoided.

The type of use of a ring buffer for storing communication variables (X, Y) that are used in an unbranched or branched information transfer represents an independent aspect of the present disclosure, which can be used exclusively or in an arbitrary combination with the other aspects and features.

When numerous communication variables (X, Y) exist, each of which is written by exactly one writer runnable (A, B), and each of which is read by one or more reader runnables (B, D/C), according to the present disclosure for each communication variable (X, Y) a separate ring buffer (MX, MY) is provided, which is assigned to the writing writer runnable (A, B). This corresponds to a (not shown) combination of the examples from FIG. 1A to FIG. 2, and FIG. 3A to FIG. 4—a ring buffer (MX) assigned to the first runnable (A), from which the second and fourth runnables (B. D) read, and a separate ring buffer (MY) assigned to the second runnable (B), from which the third runnable (C) reads.

FIG. 5A shows an example of an SC software (SC-SW) with runnables (A, E, F), between which an information transfer exists with an m-cardinality (cX: m-1). The communication variable (X) is written here by both the first runnable (A) as well as by the fifth runnable (E). It is read, however, only by the sixth runnable (F). Furthermore, other relationships of the periodicities are present in the example of FIG. 5A. The periodicity (PA) of the first runnable (A) is 1 ms. The periodicity (PE) of the fifth runnable (E) is 4 ms. The periodicity (PF) of the sixth runnable (F) is 3 ms.

A structure for the information transfer with a parallelized execution of the runnables (A, E, F) is depicted in the lower part of FIG. 5A. Which is the most currently written value of the communication variable (X) can be clearly determined for the instances (F1, F2) of the sixth runnable (F), specifically, for the instance (F1), the value written by the instance (A2), and for the instance (F2), the value written by the instance (A5).

However, for the instance (F3) of the sixth runnable (F), this may result in a non-deterministic state. At the preceding time (t=8 ms), the instance (A8) of the first runnable (A) and the instance (E2) of the fifth runnable (E) each write a value of the communication variable (X). These writings can take place in a temporally overlapping manner, or fully simultaneously. In such a case, values of the communication variables (X) can be generated with identical temporal ranks. In this case, it would not be possible to precisely determine a most current value of the communication variables (X) in an explicit manner. Furthermore, parallel writing accesses to one and the same ring buffer may result in resource conflicts.

FIG. 6 shows an MC software and an implementation for the information transfer by which the problems specified above are resolved. A parallelized execution of the numerous writer runnables (A, E) and the one reader runnable (F) is provided for, wherein, however, a separate ring buffer (MX, MX') is provided for each of the writer runnables (A, E), for storing the (shared) communication variable (X). Furthermore, a selection rule is defined for each reading access of the reader runnable (F), according to which it is determined from which of the ring buffers (MX, MX') a value of the communication variable (X) is to be read in the case of a collision. The selection of the ring buffer (MX, MX') to be used for a reading access can preferably be made as a function of a task ID, a periodicity (PA, PE, PF) of the participating runnables (A, E, F), or a task priority.

Other advantageous features of implementations of time implicit communication with a ring buffer shall be discussed below.

The examples and illustrations in FIG. 2, FIG. 4 and FIG. 6 share the aspect that exactly one writer runnable (A, B, E) is allowed to write a communication variable (X, X', Y) for each ring buffer (MX, MX', MY). This represents an autonomous concept for implementing a time implicit communication (TIC) in the parallelization of runnables, which can be used exclusively, or in an arbitrary combination with the other aspects of the present disclosure. To Each of the ring buffers (MX, MX', MY) one or more reader runnables (B, C, D, F) can be associated for reading the communication variables (X, X', Y), which read out a value from the ring buffer (MX, MX', MY) successively, in a temporally overlapping manner, or fully simultaneously.

With the porting method according to the present disclosure, a particularly efficient implementation of time implicit communication (TIC) can be obtained through the following method steps: The periodicities (PA, PW, PD, PE, PF) for the execution of the writer runnable and the at least one reader runnable are determined. Based on these periodicities, and if applicable, known phase shifts between the period cycles, analyses regarding the communication structure can be executed.

On one hand, ineffective writings (U) can be determined, for which a reading by the instances of the one or more reader runnables (B, C, D, F) cannot take place in accordance with the relationships of the periodicities (and any of the phase shifts between the periods). Such ineffective writings (U) are depicted in FIG. 2, FIG. 4 and FIG. 6 by broken lines. Effective writings, in contrast, are indicated with solid arrows.

The execution of ineffective writings (U) can be prevented, having various advantages. On one hand, through the limitation to effective writings, the necessary number of fields in a ring buffer (MX, MX', MY) can be reduced, having positive effects on the maximum duration of a search algorithm that is to locate a provided temporal rank and value for a reader runnable. On the other hand, the overhead for the storage management required for an implementation of the time implicit communication (TIC) is reduced.

Alternatively or additionally, a possibly existing recurring communication pattern (R) for the reading and writing accesses to a communication variable (X, X', Y) can be determined. Such a recurring communication pattern (R) has a pattern length (dR), which corresponds to the number of communication cycles, after which the communication pattern (R) repeats.

The number of storage spaces, or fields, respectively, that are to be reserved in a ring buffer (MX, MX', MY) can be calculated as a function of the number of instances of the writing runnable (A) in the recurring communication pattern (R), minus the number of ineffective writings (U) in the recurring communication pattern (R). A recurring communication pattern (R, R') can preferably be determined separately for each communication variable (X, Y).

In the example from FIG. 1, there is a first recurring communication pattern (R) having recurrences (R1, R2, R3, . . . ) for the communication variable (X). It has a pattern length (dR) of 3 execution cycles or communication cycles.

It has been shown that effective writings in the communication pattern (R) for the first runnable (A) only take place in every third communication cycle k=2, k=5, k=8, etc. All of the other writings are ineffective, and can be eliminated. Accordingly, only one field needs to be provided in the ring buffer (MX) (pattern duration 3-2 ineffective writings=1 field). In this special case, (periodicity PB of the precisely one reader runnable is a whole number multiple of the precisely one writer runnable) the use of a ring buffer could potentially be omitted.

Regarding the communication pattern (R') for the second communication variable (Y), there is another communication pattern (R') having recurrences (R1', R2'). The pattern duration (dR') thereof is 15 cycles. Each of the first and third writings (U) in this communication pattern (R') are ineffective, and can be eliminated. Accordingly, the ring buffer (MY) requires only 3 fields, instead of 5. (5 instances of the writer runnable—2 ineffective writings=3 fields).

According to an alternative embodiment, communication patterns (R) can also be determined collectively for numerous communication variables (X, Y). In the example of FIG. 2, the communication pattern (R') encompasses precisely five respective repetitions (R1-R2) of the communication pattern (R).

The pattern length (dR, dR') normally corresponds to the lowest common multiple of the periodicities (PA, PB, PC) of the runnables that are to be taken into account for communication pattern (R).

With each start of the communication pattern (R, R'), an overwriting of the fields in the ring buffer can be initiated. A ring buffer is particularly well suited to such periodically recurring overwritings.

In an analogous manner, the recurring communication pattern and the effective as well as the ineffective writings (U) are indicated in FIG. 4 and FIG. 6.

The determination of a recurring communication pattern (R) can also be used to calculate a running index, which can be used as a temporal rank for the storage of a value of the communication variable (X, Y) in a ring buffer (MX, MY). The running index can be defined in the interval of the communication cycle (K1, K2, K3, . . . ) and reset with each repetition (R1, R2) of the communication pattern (R).

Based on the running index (K1, K2, K3, . . . ) and the known communication structure in the recurring communication pattern (R), that value in the ring buffer (MX) that is to be used for a specific instance of a reader runnable can be determined by means of a permanent assignment rule. For this, an assignment rule is calculated based on the known communication structure, in particular based on the known pattern duration, the periodicities of the participating runnables, and the potentially existing phase shifts between the periodicities.

The running index can be an integer value, by way of example, which, starting from 0 or 1, is incremented with each execution or communication cycle, until reaching the pattern length (dR) of the communication pattern (R).

An appropriate value of the communication variable is preferably determined in a buffer memory and in particular in a ring buffer (MX, MX', MY) during the MC execution by a search algorithm, which adopts a reference value (e.g. the current point in time), and determines precisely this or a next (next higher/next lower) temporal rank within the temporal ranks that are stored in the buffer memory. For this, the so-called binary search is particularly preferably used.

The reference symbol "MX" represents ring-buffer for first communication variable. The reference symbol "MX" represents second ring-buffer for first communication variable. The reference symbol "MY" represents ring-buffer for second communication variable. The reference symbol "t" represents real time scale in milliseconds. The reference symbol "Tb" represents base-interval. The reference symbol "a" represents execution scheme/cycle scale. The reference symbol "k" represents communication scheme/cycle scale. The reference symbols "K0, K1" represents communication cycle. The reference symbol "U" represents ineffective writing. The reference symbol "IN" represents worst case time of occurrence. The reference symbol "OUT" represents worst case output time. The reference symbols "R, R'" represent recurring communication pattern. The reference symbols "R1, R1'" represent pattern repetition 1. The reference symbols "R2, R2'" represent pattern repetition 2. The reference symbols "dR, dR'" represent pattern duration in cycles. The reference symbol "Pub" represents publication time. The reference symbol "X" represents first communication variable. The reference symbol "Y" represents second communication variable. The reference symbols "WCRT, WCRT'" represent worst case reaction time.

An example of advantage of the disclosed methods is that efficient parallelization of runnables is made possible even in a case where in the existing control software more than one writer-runnable and/or more than one reader-runnable access the same persistent memory variable, i.e. when a branched information transfer is present. It will be illustrated that based on a determined cardinality of the information transfer is can be decided, in which form a time implicit communication can be implemented, in particular which kind of buffer-memory can be used with specific benefit. Beyond that, based on the determined cardinality it may be decided, if an association of the memory should be provided to a writer-runnable or to a reader-runnable.

A further advantage of the disclosed technology is that various forms of realizing or implementing the communication between at least one writer-runnable and at least one reader-runnable are shown, among which a selection can be made in the porting or converting into the MC control software to be generated. The selection can be made based on the determined cardinality and/or further parameters.

The "cardinality" of information transfer in the existing control software turned out to be a particularly important decision criterion. Based on the cardinality various parameters can be defined for the MC software to be generated. For example, the number of fields for a buffer can be optimized based on the cardinality and the periodicities of the writer- and reader-runnables taking part in an information transfer, or it may be determined for specific cardinalities, that parallelization is not advantageous, and thus that sequential execution of the runnables should also be provided in the generated MC software. Various new implementation types will be presented for the realization of time implicit communication.

The existing control software may bean SC software or an MC software already. Also the existing MC software may contain sequential parts, i.e. SC execution parts, which can be optimized in a further optimization step. Furthermore the existing control software may be an MC software, in which the implementation of communication among writer- and reader-runnables is not realized optimally. An existing MC software may already make use of time implicit communication, and the disclosed methods may potentially establish an optimized implementation for the time implicit communication, in particular by selecting a more suitable form of storing and retrieving values of a communication variable. Alternatively, an existing MC software without time implicit communication may be present and a communication among writer- and reader-runnables using time implicit communication (TIC) may be newly established in the generated software, in particular with selecting a particular suitable implementation.

With the presently disclosed method, the degree of parallelization may potentially be increased by means of a preferentially automatically performed conversion and/or the efficiency may be increased further, wherein an optimized MC control software is generated out of the existing MC control software. The aspects of the starting situation and the steps to be performed for porting an existing SC software into an MC software as well as for the conversion of an existing MC software into an optimized MC software may be identical. For this reason mainly the method for porting an SC software into an MC software will be illustrated in the present disclosure. The disclosed steps can be applied in the same way to the generation of an optimized MC software out of an existing MC software.

The existing SC control software or an existing MC software comprises so-called "runnables," which are repeatedly executed at or with predefined periodicities. A runnable comprises a code or functional section, which frequently contributes to a control output in collaboration with other runnables. A complete control output, which generates a control command as a function of at least one detected physical value, is referred to as a chain of effects. Normally. numerous runnables participate in a chain of effects, which runnables are executed at the same or different periodicities, and which exchange information by storing and reading values in communication variables. It is known that chains of effects can be identified on the basis of these writing and reading accesses to communication variables. The periodicities of the runnables within a chain of effects can differ significantly (e.g. lying between 1 ms and 128 ms). Accordingly, a typical characteristic of the existing SC control software or the existing MC control software may be that the delay varies that lasts between a change in the physical parameter and the output of a control commando depending thereof.

Each execution of a runnable is referred to as an "instance" of this runnable. If an "information transfer" or "communication between runnables" is described below, this refers to a rule for recurring information transfer, which takes place between the respective instances of different runnables. A concrete designation of the respective instances will be given in several sections for clarification and explanation. Otherwise, for the sake of simplicity and better readability, reference is made merely to the runnables that participate in the communication.

An information transfer between runnables takes place in the SC control software or in the existing MC control software through writing and reading accesses to a communication variable. A runnable that produces information (writer runnable) or one of its instances, respectively, writes a value into the communication variable. A runnable that makes use of the same information (reader runnable), or one of its instances, respectively, reads out the value from the communication variable, and potentially processes it further. The runnable that makes use of the information can at the same time be a producing runnable with respect to another communication variable. The roles of the runnables can thus be determined based on a specific communication variable.

A "chain of effects" is an input-to-output information processing that is performed in the existing control software, e.g. in order to generate a control command (output) as a reaction to a physical change to a sensed parameter (input). Within a chain of effects one or more runnables can participate as well as information transfers taking place between these runnables by using respective communication variables. By way of example, a first runnable repeatedly retrieves a physical value, and stores it as a digital numerical value in a first communication variable. A second runnable reads the numerical value from the first communication variable, calculates a status value therefrom, and stores it in a second communication variable. A third runnable reads the status value from the second communication variable, and generates a control command therefrom, which is implemented in the actuation of an actuator, for example. With respect to the digital numerical value, the first runnable is a writer runnable and the second runnable is a reader runnable. With respect to the status value, the second runnable is a writer runnable, and the third runnable is a reader runnable.

According to a first aspect of the present disclosure, the porting is performed for a SC control software, which comprises numerous repeatedly executable runnables, wherein information is exchanged between the runnables through writing (writer runnable) and reading (reader runnable) of communication variables. In a schedule for the MC software, these runnables are at least partially parallelized. As a result, it may be the case that a reader runnable, which is (always) executed after an associated writer runnable in the SC execution, is temporally preponed in MC execution, and is thus executed in MC execution at a relatively earlier point in time than in SC execution. The reader runnable can, in particular, be executed entirely in parallel to this writer runnable, or it can be executed in a temporally overlapping manner.

The first aspect of the disclosure can be applied in the same way for optimization of an existing MC software. Then a conversion of an existing MC software is performed, wherein the existing MC software comprises numerous repeatedly executable runnables, and wherein information is exchanged between the runnables through writing (writer runnable) and reading (reader runnable) of communication variables. In schedule for the MC software to be generated, these runnables are at least partially parallelized, wherein the degree of parallelization is potentially increased in the MC software to be generated compared to the existing MC software. As a result, it may be the case that a reader runnable, which was to be executed after an associated writer runnable in the SC execution, i.e. which was (always) executed temporally after the related writer-runnable, is temporally preponed in the optimized MC execution, and is thus executed at a relatively earlier point in time. The reader runnable can, in particular, be executed entirely in parallel to this writer runnable, or it can be executed in a temporally overlapping manner.

In the MC execution, a modified information exchange via time implicit communication is provided for parallelized runnables, in order to replace the SC chain of effects with an MC chain of effects having the same control results, or respectively in order to replace sequential parts in the existing MC chain of effects by an optimized MC chain of effects having the same control results. As a result, the communication of the individual values, as in the SC case, becomes predictable in a precise way, which is what distinguishes the subject matter of the present disclosure from other MC communication methods. The concept of the time implicit communication shall be explained below on the basis of an example.

It is assumed that it is provided in the SC execution that an instance of a writer runnable initiated in a repetition interval g (g writer instance) writes a datum in a communication variable, which is read immediately thereafter by an instance of the reader runnable likewise initiated in the repetition interval g (g reader instance). The writer runnable'and the reader runnable are thus sequentially executed within the same repetition interval g.

When the writer runnable and the reader runnable are parallelized in the (optimized) MC execution, it cannot be ensured that the writing of the datum by the g writer instance is completed before the g reader instance wants to access this information. However, in order to enable a predictable information exchange in MC execution, the information transfer is redirected through time implicit communication to a value of the communication variable that was written in an earlier repetition interval. Time implicit communication means that instead of being provided with the information value from the g repetition interval the g reader instance is provided with an information value not coming from the (parallel running) g writer instance, but rather from an earlier instance, e.g. the preceding g-1 writer instance,. Through this redirection of the temporal reference in the information transfer, a modified MC chain of effects is formed, which leads to same results in terms of content (valid control command), but can, however, cover a somewhat larger number of repetition intervals, in particular when the time implicit communication is used in the chain of effects with regard to multiple communication variables. In other words, through redirecting the temporal reference, a structural extension of a chain of effects may be created. The structural extension can however be compensated for through a temporal scaling of the execution scheme, such that the MC software does not have an effective delay for providing a control output.

In other words, through suitable means, described by way of example in unpublished DE 10 2016 107 646.5, it can be ensured that despite the parallelization of the runnables, and the associated structural change to a chain of effects through the instances of the runnables, the control output is always implemented such that the ported MC control software generates a valid control result within the necessary reaction time. By way of example, the periodicities provided for the runnables could be accelerated and/or a processor cycle of the MC control device can be modified such that even with a structural extension of the chain of effects, it is possible to comply with, or stay within, a duration of the worst case reaction delay determined or defined for SC software.

According to the present disclosure, various measures are proposed, with which an even more extensive parallelization of runnables is enabled in the MC control software, and/or the information transfer takes place particularly efficiently (resource-optimal) and/or with a minimum of access time.

The term "cardinality" is used below to indicate the numerical relationship of reader runnables and writer runnables when accessing a specific communication variable. The term "cardinality" is used in a manner analogous to the min-max notation known in the so-called entity-relationship system, and it indicates how many writer-runnables or reader-runnables participate exactly or at maximum in the information transfer with respect to a specific communication variable, i.e. as a ratio of the "number of writer runnables" to the "number of reader runnables." In the scope of the present disclosure, a 1-to-1 cardinality (1 writer, 1 reader), a 1-to-n cardinality (1 writer, multiple or at maximum n readers), an m-to-1 cardinality (multiple or at maximum m writers, 1 reader), and an m-to-n cardinality (multiple or at maximum m writers, multiple or at maximum n readers) are possible, which shall be explained in detail below. Furthermore, the terms "writer-to-reader cardinality" and "cardinality of the information transfer" are used as associated terms.

In the porting method and in the optimization method according to the present disclosure, according to a first aspect, an analysis of the existing control software is carried out with respect to the writer-to-reader cardinality of the information exchange with respect to a specific communication variable. Parallelization or sequencing of the participating writer runnables and reader runnables is established depending on the determined writer-to-reader cardinality. For example, in case of a 1-to-1 cardinality parallelization may be established, whereas in case of an m-to-1 or m-to-n cardinality no parallelization may be established. Based on the detected cardinality it may furthermore be defined, in which form time implicit communication among the one or more writer-runnables and the one or more reader-runnables is to be implemented. It is particularly preferred that rules are deposed for those decisions, which can be enforced automatically.

As a result of the rule based decision depending on the detected cardinality, it is achieved that there is always found an optimized implementation for the various possible forms of information exchange between one or more reader runnables and one or more writer runnables in the MC execution. Thus, the possibilities for a performance improvement through the porting to an MC control device are discovered with greater precision, and implemented in an MC control software with quicker and/or resource-optimized behavior.

Furthermore, a parallelization of runnables participating in a branched information exchange is made possible. An unbranched information exchange takes place from precisely one writer runnable to precisely one reader runnable, i.e. the cardinality of the information transfer is 1-to-1. In a branched information exchange, more than one writer runnable and/or more than one reader runnable participate, each of which accesses the same communication variable, i.e. there may be a 1-to-n cardinality, an m-to-1 cardinality, or an m-to-n cardinality. An m-to-n cardinality is very unusual in vehicle control software. If an m-to-n cardinality is found, then either a parallelization of the writer runnables and reader runnables can be avoided, or a formal division into sub-groups may be performed for the information exchange, which sub-groups are treated according to the rules described below. An m-to-n cardinality can be formally divided into m sets of a 1-to-n cardinality or into n sets of an m-to-1 cardinality.

A realization or implementation of time implicit communication can have various forms. For example, in case of a determined 1-to-1 cardinality, the related communication variable may be stored in a double-buffer with switching logic. The switching logic causes that one field of the double-buffer is always available for a write-procedure, while the other field is accessible for one or several read procedures. Upon conclusion of a write-procedure the field assignments are interchanged. In doing so, always the most up-to-date value of the communication variable is made available in the field that can be accessed with a read-procedure.

In the scope of the present disclosure, it is possible to use double-buffers in the realization of time implicit communication for a 1-to-n cardinality, wherein in particular a separate double-buffer is set up at multiple or each of the n readers, and wherein the value of the communication variable to be written is stored in multiple or all double-buffers. However, this realization become complicated due to the write-procedure that have to be performed multiple times, and performance increase through parallelization may be faced with a performance-disadvantage due to multiple write procedures and a high memory consumption, so that this implementation seems suitable only for low numbers of readers, e.g. for n=2 or n=3. In case of a 1-to-n cardinality, based on deceeding a predefined threshold for the number n of reader runnables, parallelized execution of the writer runnable and the at least one reader runnable may be established. Furthermore, the related communication variable may be stored (multiple times) in a respective double buffer, which is associated to a reader runnable. The predefined threshold may be set based on the specific architecture and amount, for example, to the value 2 or 3. The implementations mentioned below do not have such disadvantages of multiple write-procedures or increased memory consumption.

According to a further aspect of the present disclosure, time implicit is communication (TIC) is implemented, by storing values of a communication variable together with an assigned temporal rank in a buffer (buffer memory having numerous fields/memory cells), in particular in a ring buffer. This form of implementation is particularly beneficial for the case of a 1-to-n cardinality. According to the ratio of repeated executions of the writer-runnable and the reader-runnables it may be meaningful or required to store the values from various instances of the writer runnable and to keep the accessible to the various reader-runnables. One or more reader runnables that want to access this communication variable are provided with an appropriate value from the buffer, selected as a function of the temporal rank. The selection rules can be in accordance with arbitrary criteria. On one hand, the respective most current temporal rank can be located in the buffer through an appropriate search strategy, and the value assigned thereto can be made available to the reader runnable.

Efficient and quick finding of the correct value of the communication variable may be crucial to the execution speed of the generated MC software. The efficiency of search algorithms that shall determine the correct time rank and thus the correct value for a reader runnable, depends on the structure of the stored information within the buffer. As a rule, particularly fast search is possible on data lines, in which the values are stored in a sorted order, thus either in increasing or decreasing order.

The storage of the values with time ranks in a respective separate buffer, in particular a separate ring-buffer for each writer runnable results in the temporal ranks always being stored in the buffer in an increasing order, such that a sorted data stock is maintained in the buffer. As a result, it is possible to search for the correct, or most current, temporal rank in the buffer with a particularly efficient search algorithm, in particular with so-called binary search. Furthermore, non-deterministic states are prevented in the buffer, by preventing the occurrence of identical temporal ranks.

On the other hand, a calculating scheme for the direct determination of the correct value (provided for the respective instance of the reader runnable) can be deposed. The calculating scheme is particularly advantageous when a repetitive communication pattern can be determined for the reading and writing accesses with respect to a specific communication variable, which has a fixed pattern length. Such a pattern length can be reflected in particular by a specific number of communication cycles, after which the communication pattern repeats. Thus number frequently corresponds to the lowest common multiple of the periodicities of the participating reader runnables and (preferably precisely one) writer runnable.

So-called ring buffers have proven to be particularly beneficial for the efficient storage of values of the communication variables. Such a ring buffer may in particular be used for the realization of time implicit communication (TIC) in case of a 1-to-n cardinality, and in fact independently of the number n of reader-runnables. Ring buffers normally have a fixed number of fields or storage cells, which are overwritten cyclically. For the sake of realistic illustration, it will be assumed below, that, in case of MC execution and usage of time implicit communication, values of a communication variable are stored in a ring buffer. However, the s disclosure is not limited thereto. Another type of buffer memory can always be used as well, in particular a double buffer with switching logic.

Any arbitrary value that allows an association to the temporal course of the program execution can be used as a temporal rank for the storage of a value of the communication variable. There are, however, preferred forms for the storage of a temporal rank.

On one hand, a cyclical processing scheme can be used for executing the runnable. In such a case, an execution cycle index can be used as the storage value for the temporal rank. Alternatively or additionally, a cyclical communication scheme can be used for the information transfer. In such a case, a communication cycle index can be used as the storage value for the temporal rank.

When a communication scheme having a fixed pattern length has been identified, a running index can also be used as the storage value for the temporal rank. The running index can count the communication cycles or execution cycles or a real time since the beginning of a repetition of the communication cycle, for example.

A running index is particularly preferably used as the storage value for the temporal rank, which running index is reset at the start of each repetition of the communication pattern, and is incremented with each communication cycle. The correct value in the ring buffer can then be determined on the basis of the running index and a fixed assignment rule. The assignment rule is calculated based on the static temporal relations of writing and reading accesses to a communication variable in the communication pattern, in particular on the basis of the periodicities of the (preferably just one) writer runnable and the at least one reader runnable. Any phase shifts that are present between the periods of the runnables can also be taken into account for the calculation of the assignment rule. A phase shift occurs, for example, when the earliest instance of a runnable in the communication pattern does not begin in the first execution or communication cycle, but rather in another cycle. The assignment rule indicates which reader instance in the communication pattern is assigned to which running index stored in the ring buffer for the readout of an associated value. The rule-based determination of a value in the ring buffer can be executed particularly quickly and substantially independently of the size of the ring buffer, or number of fields therein.

As the content of the temporal rank, any suitable reference value can be used, which enables an association to the temporal course of the control software. This can be a current execution cycle during a writing procedure, for example, or it can be that execution cycle at which the instance of the writing runnable was started (in particular if the execution of the instance lasts for more than one execution cycle). Thus, values can be stored as a temporal rank, which relate to the momentary point in time or to relevant temporal trigger-points lying in the past. Alternatively and preferably, a publication time (lying in the future) can be defined and stored as a temporal rank of a value of the communication variable to be stored. Preferably, a reading access to this value of the communication variable is not enabled before reaching the publication time. The publication time can be calculated according to various criteria. Particularly preferably, a subsequent communication cycle or subsequent execution cycle, starting after the current writing procedure, is established as the publication time. Alternatively, a subsequent communication cycle or subsequent execution cycle, starting after termination of the writing instance, can serve as the publication time.

Through the use of publication times and in particular, reference to a uniform, cycle-based execution scheme and/or communication scheme, a well-structured performance of the control is enabled, which provides for greater efficiency in the management of the memory, and exhibits resistance to errors.

The optimization method according to the present disclosure may also be used for analyzing an already existing implementation of communication in the existing MC control software and to change the implementation in the MC control software to be generated, wherein in particular time implicit communication and/or an optimized implementation of time implicit communication may be established in the MC software to be generated. It is in particular possible, to perform an analysis of the existing MC control software with respect to the writer-to-reader cardinality of the information exchange, and it may be defined based on the determined cardinality, if the existing implementation of communication shall be maintained depending on the determined writer-to-reader cardinality, or if another implementation of communication is established in the MC software to be generated, in particular an implementation of time implicit communication (TIC). If, for example, a 1-to-n cardinality is determined and the existing implementation uses a multiplicity of double buffers, which are associated to reader-runnables, time implicit communication (TIC) may instead be established in the MC software to be generated by storing the related communication variable in a separate ring buffer, which is associated to the writer-runnable. The optimization method according to the present disclosure may thus (also) be used to select a better implementation for time implicit communication based on a determined cardinality of the information transfer with respect to a specific communication variable, and to establish the better implementation in the MC software to be generated.

Further embodiments of the present disclosure are described in the present disclosure, the attached figures, and the description of the drawings.

While the embodiments, the configurations, the aspects of method for porting a single-core control software to a multi-core control device or for optimizing a multi-core control software have been described by way of example, it should be appreciated that embodiments, configurations, aspects of the present disclosure are not limited to the respective embodiments, the respective configurations, and the respective aspects described above. For example, embodiments, configurations, aspects obtained by appropriately combining technical portions disclosed in different embodiments, configurations, and aspects are included within a range of embodiments, configurations, and aspects of the present disclosure.

What is claimed is:

1. A method for porting an existing vehicle control software developed for a single-core control device into a modified multi-core control software that can be executed on a multi-core control device,
   wherein the existing vehicle control software comprises numerous repeatedly executable runnables, and
   wherein information is exchanged between the runnables through writing and reading of related communication variables, and
   wherein a modified information exchange via time implicit communication is provided for parallelized runnables in the multi-core control software that is generated by the method, the method comprising:
   analyzing the existing vehicle control software regarding a writer-to-reader cardinality of the information exchange with respect to a related communication variable; and defining an implementation of the time implicit communication as a function of the determined writer-to-reader cardinality, wherein:
a parallelized execution of a writer-runnable and at least one reader-runnable in a 1-to-n writer-to-reader cardinality is established in the generated multi-core control software, and
the related communication variables in the 1-to-n writer-to-reader cardinality are respectively stored in ring buffers, which are separated from each other, each of the ring buffers being assigned to a respective writer-runnable.

2. The method according to claim 1,
wherein a value of the related communication variable, together with an associated temporal rank, are stored in a ring buffer, and
wherein that value in the ring buffer that is to be used for a specific instance of a reader runnable is determined on a basis of the temporal rank, in particular through searching for a most current temporal rank.

3. The method according to claim 2,
wherein the search for the value that is to be used is provided by a binary search.

4. The method according to claim 1,
wherein each of the related communication variables is stored in a double buffer or in the ring buffer, which is assigned to the respective writer-runnable.

5. The method according to claim 1,
wherein the related communication variables are stored in each double buffer, which are associated to a respective reader-runnable, in particular if the number n of reader-runnables is below a predefined threshold.

6. A method for porting an existing vehicle control software developed for a single-core control device into a modified multi-core control software that can be executed on a multi-core control device,
wherein the existing vehicle control software comprises numerous repeatedly executable runnables, and
wherein information is exchanged between the runnables through writing and reading of related communication variables, and
wherein a modified information exchange via time implicit communication is provided for parallelized runnables in the multi-core control software that is generated by the method, the method comprising:
analyzing the existing vehicle control software regarding a writer-to-reader cardinality of the information exchange with respect to a related communication variable; and
defining an implementation of the time implicit communication as a function of the determined writer-to-reader cardinality,
wherein a parallelized execution of a writer-runnable and at least one reader-runnable in a 1-to-n writer-to-reader cardinality is established in the generated multi-core control software and the related communication variable is stored in a separate ring buffer, which is associated to the writer-runnable, and
wherein a sequential execution of numerous writer-runnables and one reader-runnable in an m-to-1 writer-to-reader cardinality is provided, and
wherein a separate ring buffer is provided for each of the writer runnables, for storing the related communication variable, and
wherein it is determined, according to a selection rule, from which of the ring buffers the value of the related communication variable is to be read for each reading access by the reader runnable.

7. The method according to claim 6,
wherein the selection of the ring buffer that is to be used for a reading access is made as a function of a task ID, a periodicity of the participating runnables or a task priority.

8. A method for porting an existing vehicle control software developed for a single-core control device into a modified multi-core control software that can be executed on a multi-core control device,
wherein the existing vehicle control software comprises numerous repeatedly executable runnables, and
wherein information is exchanged between the runnables through writing and reading of related communication variables, and
wherein a modified information exchange via time implicit communication is provided for parallelized runnables in the multi-core control software that is generated by the method, the method comprising:
analyzing the existing vehicle control software regarding a writer-to-reader cardinality of the information exchange with respect to a related communication variable; and
defining an implementation of the time implicit communication as a function of the determined writer-to-reader cardinality,
wherein a parallelized execution of a writer-runnable and at least one reader-runnable in a 1-to-n writer-to-reader cardinality is established in the generated multi-core control software, and the related communication variables in the 1-to-n writer-to-reader cardinality are respectively stored in ring buffers, which are separated from each other, each of the ring buffers being assigned to a respective writer-runnable,
wherein for each ring buffer, precisely one writer runnable is allowed to write the related communication variable and one or more reader runnables are allowed to read the related communication variable, and
wherein the method further comprises:
determining periodicities of the executions of the writer runnable and the at least one reader runnable;
determining ineffective writings, in which no reading can take place due to relationships of the periodicities; and
avoiding the ineffective writings.

9. A method for porting an existing vehicle control software developed for a single-core control device into a modified multi-core control software that can be executed on a multi-core control device,
wherein the existing vehicle control software comprises numerous repeatedly executable runnables, and
wherein information is exchanged between the runnables through writing and reading of related communication variables, and
wherein a modified information exchange via time implicit communication is provided for parallelized runnables in the multi-core control software that is generated by the method, the method comprising:
analyzing the existing vehicle control software regarding a writer-to-reader cardinality of the information exchange with respect to a related communication variable; and
defining an implementation of the time implicit communication as a function of the determined writer-to-reader cardinality,
wherein a parallelized execution of a writer-runnable and at least one reader-runnable in a 1-to-n writer-to-reader cardinality is established in the generated multi-core control software, and the related communication variables in the 1-to-n writer-to-reader cardinality are respectively stored in ring buffers, which are separated from each other, each of the ring buffers being assigned to a respective writer-runnable, and wherein a communication scheme is used for the writing and reading of the related communication variables, based on uniform communication cycles, and in which:
- a base interval is established, having a specific duration, and each communication cycle lasts as long as the base interval,
- writing accesses can take place at an arbitrary point in time, in order to write a current value of the related communication variable into a field of a ring buffer, and
- for each written value of the related communication variable a specific future communication cycle is established as a publication time and temporal rank, wherein the written value is not made available for a reading access before reaching the publication time.

10. The method according to claim 9,
wherein an execution scheme is used for the execution of runnables that exchange information regarding the related communication variables, which execution scheme is based on uniform execution cycles, and
wherein the length of the execution cycle is identical to the length of the communication cycle.

11. The method according to claim 9,
wherein a recurring communication pattern is determined for the reading and writing accesses to the related communication variable, having a fixed pattern length, wherein the pattern length is the number of communication cycles after which the communication pattern repeats, and
wherein a running index is used as the temporal rank for storing a value of the related communication variable in a ring buffer, which is reset with each recurrence of the communication pattern, and
wherein a value in the ring buffer, which is to be used for a specific instance of a reader runnable, is determined on a basis of the running index and a fixed assignment rule.

12. The method according to claim 11,
wherein the assignment rule is calculated based on a known pattern length and the periodicities of the participating runnables.

13. The method according to claim 1,
wherein the number of storage spaces to be reserved in a ring buffer is calculated as a function of the number of instances of the writing runnable in a recurring communication pattern, minus the number of ineffective writings in the recurring communication pattern.

14. A method for converting an existing vehicle control software, which is already developed for a multi core control device, into an optimized multi-core control software,
wherein the existing vehicle control software comprises numerous repeatedly executable runnables, and
wherein information is exchanged between the runnables through writing and reading of related communication variables, and
wherein a modified information exchange via time implicit communication is provided for parallelized runnables in the multi-core control software that is generated by the method, the method comprising:
analyzing the existing vehicle control software regarding a writer-to-reader cardinality of the information exchange with respect to a related communication variable; and
defining an implementation of the time implicit communication as a function of the determined writer-to-reader cardinality, wherein:
a parallelized execution of a writer-runnable and at least one reader-runnable in a 1-to-n writer-to-reader cardinality is established in the generated multi-core control software, and
the related communication variables in the 1-to-n writer-to-reader cardinality are respectively stored in ring buffers, which are separated from each other, each of the ring buffers being assigned to a respective writer-runnable.

15. A method for porting an existing vehicle control software developed for a single-core control device into a modified multi-core control software that can be executed on a multi-core control device,
wherein the existing vehicle control software comprises numerous repeatedly executable runnables, and
wherein information is exchanged between the runnables through writing and reading of related communication variables, and
wherein a modified information exchange via time implicit communication is provided for parallelized runnables in the multi-core control software that is generated by the method, the method comprising:
analyzing the existing vehicle control software regarding a writer-to-reader cardinality of the information exchange with respect to a related communication variable; and
defining an implementation of the time implicit communication as a function of the determined writer-to-reader cardinality,
wherein a parallelized execution of a writer-runnable and at least one reader-runnable in a 1-to-n writer-to-reader cardinality is established in the generated multi-core control software and a related communication variable is stored in a separate ring buffer, which is associated to the writer-runnable, and
wherein a parallelized execution of the numerous writer runnables and the one reader runnable in an m-to-1 writer-to-reader cardinality are provided, and
wherein a separate ring buffer is provided for each writer runnable, for storing the related communication variable, and
wherein it is determined, according to a selection rule, from which of the ring buffers the value of the communication variable is to be read for each reading access by the reader runnable.

16. The method according to claim 15,
wherein the selection of the ring buffer that is to be used for a reading access is made as a function of a task ID, a periodicity of the participating runnables or a task priority.

* * * * *